(12) United States Patent
Nagase et al.

(10) Patent No.: US 6,338,915 B1
(45) Date of Patent: Jan. 15, 2002

(54) HERMETICALLY SEALED STORAGE BATTERY

(75) Inventors: Takashi Nagase, Matsushige; Takeo Hamamatsu; Masao Inoue, both of Tokushima; Hideyuki Asanuma, Matsushige, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/537,390

(22) Filed: Mar. 29, 2000

(30) Foreign Application Priority Data

Mar. 30, 1999  (JP) .......................................... 11-089583

(51) Int. Cl.⁷ ............................ H01M 2/10; H01M 2/04
(52) U.S. Cl. ........................... 429/186; 429/57; 429/54; 429/185; 429/175
(58) Field of Search .................. 429/54, 53, 55, 429/186, 57, 82, 89, 64, 185, 7, 176, 175

(56) References Cited

U.S. PATENT DOCUMENTS

| | | | |
|---|---|---|---|
| 5,554,455 A | * | 9/1996 | Inoue et al. .................. 429/53 |
| 6,218,045 B1 | * | 4/2001 | Ide et al. ..................... 429/176 |
| 6,235,419 B1 | * | 5/2001 | Marukawa et al. ........... 429/53 |

FOREIGN PATENT DOCUMENTS

| | | | |
|---|---|---|---|
| EP | 0692829 | * 1/1996 | .......... H01M/02/12 |
| JP | 57-163672 | 10/1982 | |
| JP | 9-161755 | 6/1997 | |
| JP | 2703249 | 10/1997 | |

* cited by examiner

*Primary Examiner*—Stephen Kalafut
*Assistant Examiner*—Raymond Alejandro
(74) *Attorney, Agent, or Firm*—Nixon & Vanderhye P.C.

(57) ABSTRACT

A battery structure is arranged such that an elastic valve body or the like cannot easily come off from the cover body during the production of the battery, which thereby enhances the production yield. A cover body of the invention includes a flange portion airtightly fixed to an injection port and a bulge portion protruding from the flange portion and provided with a space in which an elastic valve body is fitted (mounted). The bulge portion has an opening for ventilation provided on the side wall thereof and a protrusion at the lower end of the side wall thereof protruding inwardly of the side wall, whereby the elastic valve body can be held by the protrusion and the annular rim of the elastic valve body so that it can be prevented from coming off from the cover body. Accordingly, the elastic valve body can be prevented from coming off from the cover body due to vibration developed during the transportation of the cover body or like occasions, making it possible to enhance the production yield.

13 Claims, 8 Drawing Sheets

HERMETICALLY SEALED STORAGE BATTERY

BACKGROUND OF THE INVENTION

1. Field of the Invention

The present invention relates to a hermetically sealed storage battery such as nickel-hydrogen storage battery, nickel-cadmium storage battery and lithium ion battery. More particularly, the present invention relates to a hermetically sealed storage battery provided with a cover body for hermetically sealing an opening formed therein such as opening for gas exhaust and opening for injection of electrolytic solution.

2. Description of the Related Art

In general, a hermetically sealed storage battery such as nickel-hydrogen storage battery, nickel-cadmium storage battery and lithium ion battery is prepared by a process which comprises inserting an electricity-generating element having a positive electrode and a negative electrode laminated on each other with a separator provided interposed between into a closed-end rectangular cylindrical metallic can, injecting an electrolytic solution into the can, and then welding a sealing plate to the opening of the can. The sealing plate is provided with a gas vent for exhausting a gas generated in the battery. A metallic cover body provided with an elastic valve (safety valve device) is disposed in the gas vent. The metallic cover body is welded to the sealing plate at the periphery thereof to seal the battery.

Referring now to the operation of the metallic cover body provided with an elastic valve body, since the elastic valve body is compressed, the interior of the battery can be kept air-tight while the cover body is mounted on the battery. When a gas is produced in the battery to raise the inner pressure beyond a predetermined value, the elastic valve body is compression deformed to allow the gas to be readily released. When the inner pressure of the battery falls below the predetermined value, the elastic valve body is released from the compression and then spontaneously restored to keep the interior of the battery air-tight again.

However, since the foregoing elastic valve body is merely kept inserted in the metallic cover body until the metallic cover body is mounted on the gas vent in the sealing plate, vibration developed during the preparation of the battery, e.g., during the transportation of the cover body causes the elastic valve body to come off from the metallic cover body, lowering the production yield.

Therefore, a means has been employed involving the bonding of the elastic valve body to the cover body with an adhesive for the purpose of preventing the elastic valve body from coming off from the metallic cover body due to vibration during the production of battery, i.e., transportation of the cover body. However, it is difficult to uniformalize the coated amount of adhesive, making it impossible to obtain expected effects. Further, the facilities required to make the coated amount of adhesive constant are not simple, complicating the production.

SUMMARY OF THE INVENTION

The present invention has thus been worked out in the light of the foregoing problems. An object of the present invention is to provide a battery structure such that an elastic valve body or the like cannot easily come off from the cover body during the production of the battery and hence enhance the production yield.

In order to solve the foregoing problems, a first aspect of the present invention is a hermetically sealed storage battery comprising a cover body for hermetically sealing an opening provided in a storage battery, wherein the cover body comprises: a flange portion airtightly fixed to the opening; a bulge portion protruding from the flange portion and provided with a space in which an elastic body is mounted, and a hook portion formed on an inner wall of the bulge portion, for keeping an annular rim formed on the peripheral side wall protruding outwardly of the elastic valve body, wherein the elastic valve body is held by the hook portion and the annular rim so that it can be prevented from coming off from the cover body.

A second aspect of the battery is a hermetically sealed storage battery according to the first aspect, wherein the hook portion comprises a protrusion portion protruding inwardly of a lowest end of the side wall of the bulge portion formed on an inner wall of the bulge portion, and the annular rim is hooked by the protrusion portion.

A third aspect of the battery is a hermetically sealed storage battery according to the second aspect, wherein the protrusion portion comprises a plurality of protrusions for hooking the annular rim at the end of the protrusions.

A fourth aspect of the battery is a hermetically sealed storage battery according to the third aspect, wherein the protrusion portion comprises a pair of protrusions protruding slant-inwardly from two positions being symmetrical to each other.

A fifth aspect of the battery is a hermetically sealed storage battery according to the second aspect, wherein the bulge portion is provided with an opening for ventilation on the side wall thereof and the elastic body constitutes an elastic valve body.

By arranging the cover body as mentioned above, the elastic valve body can be kept by the protrusion portion and the annular rim prevented from coming off from the cover body, making it possible to prevent the elastic valve body from coming off from the metallic cover body due to vibration, e.g., during the transportation of the cover body and hence enhance the production yield. Further, since no adhesive for holding the elastic valve body is required, production facilities and control are simple, making it easy for this type of cover body to be mounted.

A sixth aspect of the battery is a hermetically sealed storage battery according to the second aspect, wherein the outer diameter of the annular rim is greater than the distance between the protrusion portions.

By providing the elastic valve body with an annular rim on the peripheral side wall thereof protruding outwardly of the elastic valve body in such an arrangement that the outer diameter of the annular rim is greater than the distance between the protrusion portions and the annular rim comes in contact with the inner wall of the cover body, the mispositioning of the elastic valve body can be prevented, making it assured that the elastic valve body can be compression-deformed when the inner pressure of the battery reaches the predetermined value and thus can sufficiently serve as a safety valve as well as maintain airtightness. At this time, the protrusion portion is kept separated from the elastic valve body. In other words, the distance between the protrusion portions is smaller than the outer diameter of the annular rim of the elastic valve body and greater than the outer diameter of the peripheral side wall of the elastic valve body.

A seventh aspect of the battery is a hermetically sealed storage battery according to the second aspect, wherein the hook portion is an inclined portion on the inner side wall of the bulge portion running inwardly of the ceiling thereof toward the flange portion.

An eighth aspect of the battery is a hermetically sealed storage battery according to the seventh aspect, wherein the bulge portion is provided with an opening for ventilation on the side wall thereof and the elastic body constitutes an elastic valve body.

A ninth aspect of the battery is a hermetically sealed storage battery according to the seventh aspect, wherein the outer diameter of the annular rim is greater than the minimum distance between the inclined portions.

A tenth aspect of the battery is a hermetically sealed storage battery according to the seventh aspect, wherein the elastic body is mounted so as to contact with the inner side wall and the ceiling of the bulge portion.

Even if the bulge portion is provided with an inclined surface on the inner wall thereof extending inwardly of the ceiling of the bulge portion toward the flange portion instead of providing a protrusion portion at a part of the side wall of the bulge portion protruding inwardly of the side wall, the elastic valve body can be held in almost the same manner as mentioned above.

Moreover, in accordance with the invention, an elastic body having no safety valve function can be held in the cover body instead of elastic valve body, making it possible to prevent the elastic body from coming off from the cover body due to vibration developed during the transportation of the cover body as well as seal airtightly an opening provided in the battery such as injection port.

BRIEF DESCRIPTION OF THE DRAWINGS

FIG. 1 is a diagram illustrating the cover body of the first example wherein

FIG. 2 is a diagram illustrating an elastic valve body mounted on the cover body of FIG. 1 wherein

FIG. 3 is a diagram illustrating the cover body of the second example wherein

FIG. 4 is a diagram illustrating an elastic valve body mounted on the cover body of FIG. 3 wherein

FIG. 5 is a diagram illustrating the cover body of the third example wherein

FIG. 6 is a diagram illustrating an elastic valve body mounted on the cover body of FIG. 5 wherein

DESCRIPTION OF THE PREFERRED EMBODIMENTS

Figure 1A:
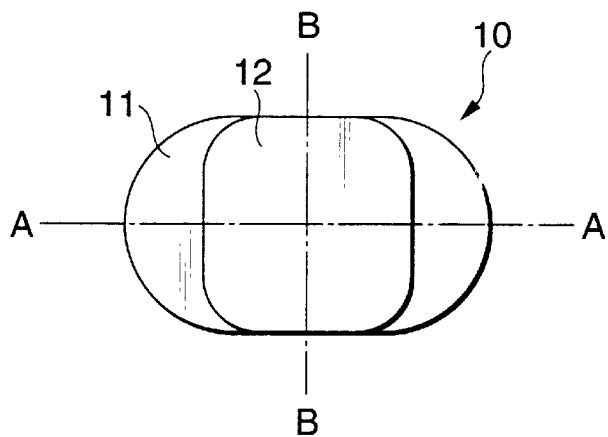
FIG. 1(a) is a top view.
Figure 1B:
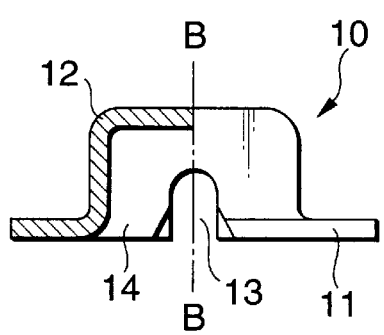
FIG. 1(b) is a partially cutaway front view.
Figure 1C:
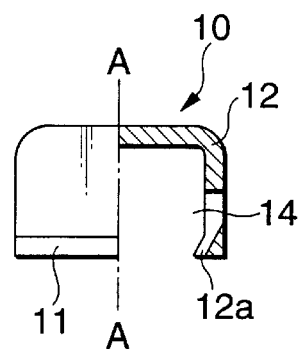
FIG. 1(c) is a partially cutaway side view.
Figure 1D:
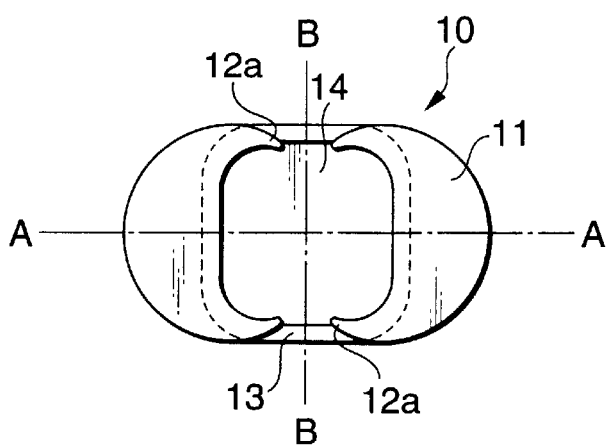
FIG. 1(d) is a bottom view.
Figure 2A:
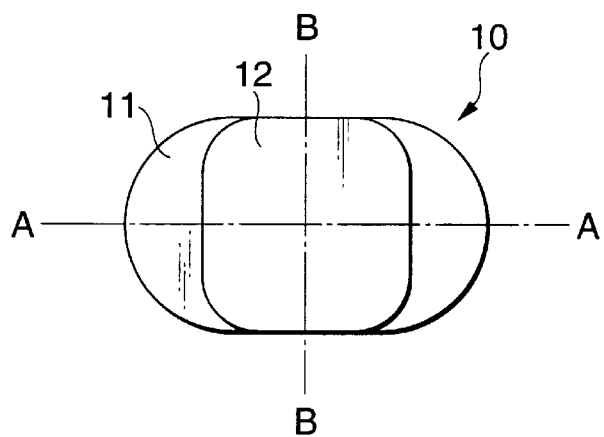
FIG. 2(a) is a top view.
Figure 2B:
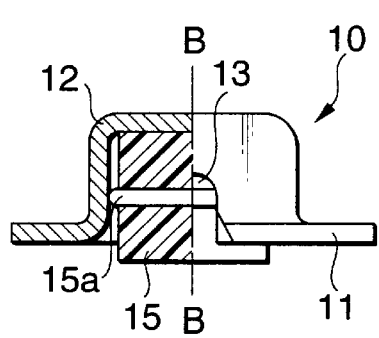
FIG. 2(b) is a partially cutaway front view.
Figure 2C:
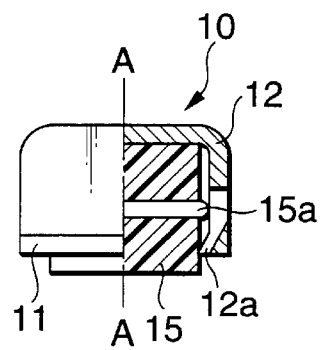
FIG. 2(c) is a partially cutaway side view.
Figure 2D:
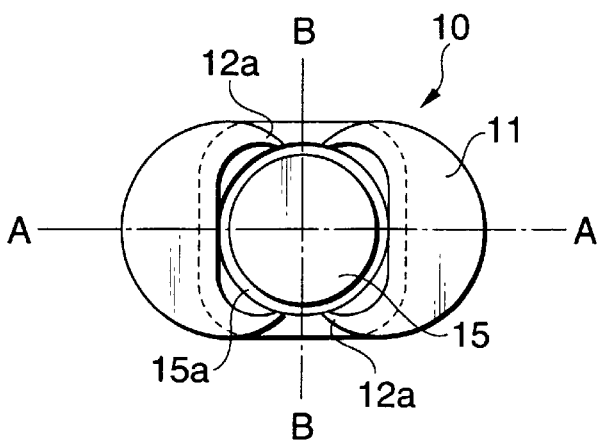
FIG. 2(d) is a bottom view.

The present invention will be further described with reference to an embodiment of implication of the invention wherein the invention is applied to nickel-hydrogen storage batteries in connection with the attached drawings. FIG. 1 is a diagram illustrating a cover body of the first example wherein FIG. 1(a) is a top view, FIG. 1(b) is a partially cutaway front view, FIG. 1(c) is a partially cutaway side view, and FIG. 1(d) is a bottom view. FIG. 2 is a diagram illustrating an elastic valve body mounted on the cover body of FIG. 1 wherein FIG. 2(a) is a top view, FIG. 2(b) is a partially cutaway front view, FIG. 2(c) is a partially cutaway side view, and FIG. 2(d) is a bottom view.

Figure 3A:
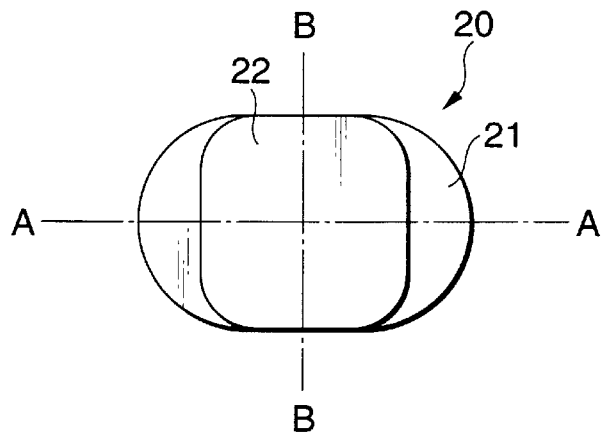
FIG. 3(a) is a top view.
Figure 3B:
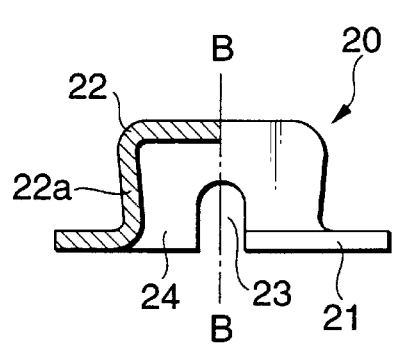
FIG. 3(b) is a partially cutaway front view.
Figure 3C:
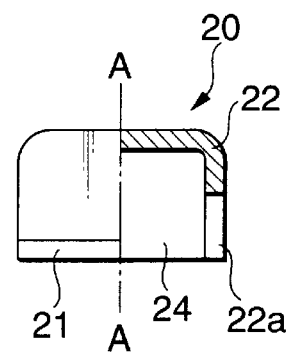
FIG. 3(c) is a partially cutaway side view.
Figure 3D:
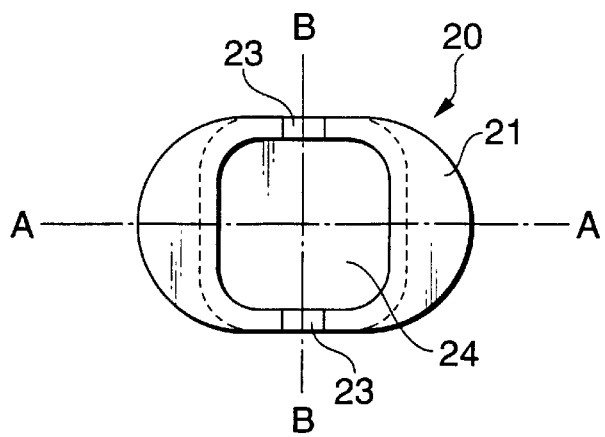
FIG. 3(d) is a bottom view.
Figure 4A:
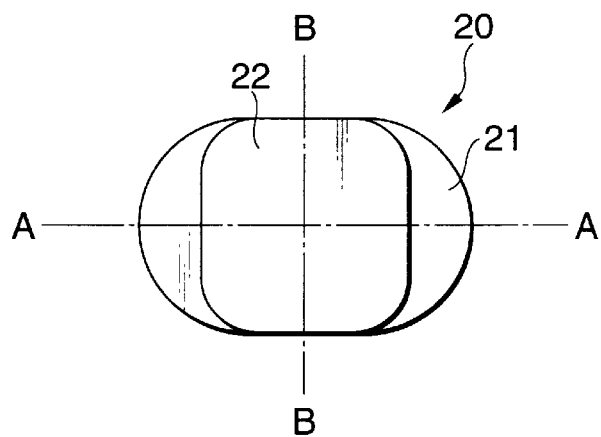
FIG. 4(a) is a top view.
Figure 4B:
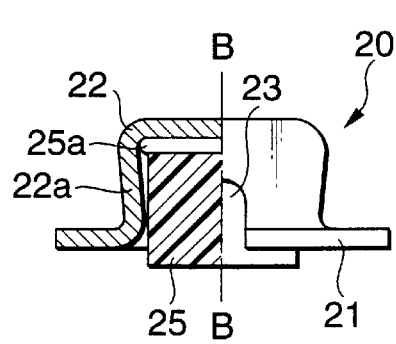
FIG. 4(b) is a partially cutaway front view.
Figure 4C:
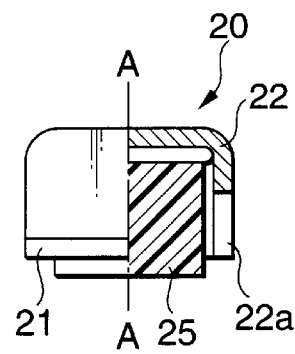
FIG. 4(c) is a partially cutaway side view.
Figure 4D:
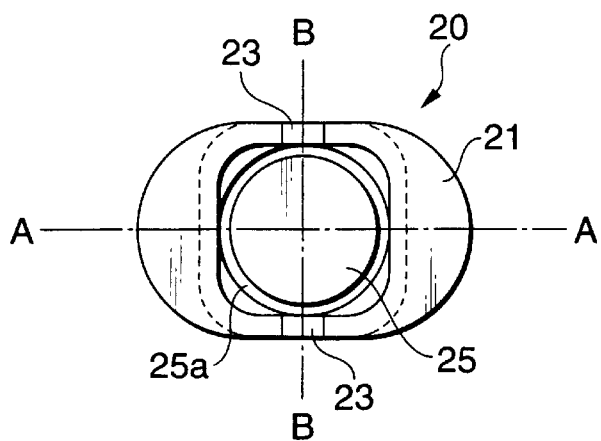
FIG. 4(d) is a bottom view.

FIG. 3 is a diagram illustrating a cover body of the second example wherein FIG. 3(a) is a top view, FIG. 3(b) is a partially cutaway front view, FIG. 3(c) is a partially cutaway side view, and FIG. 3(d) is a bottom view. FIG. 4 is a diagram illustrating an elastic valve body mounted on the cover body of FIG. 3 wherein FIG. 4(a) is a top view, FIG. 4(b) is a partially cutaway front view, FIG. 4(c) is a partially cutaway side view, and FIG. 4(d) is a bottom view.

Figure 5A:
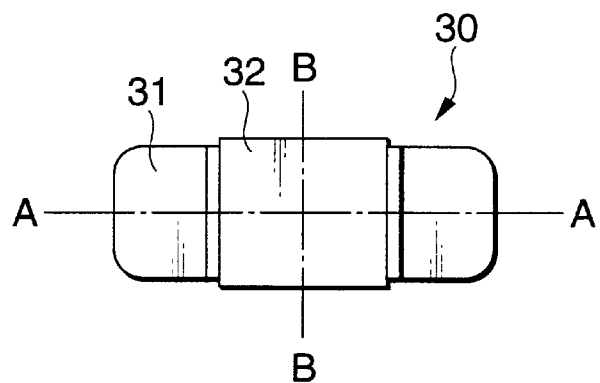
FIG. 5(a) is a top view.
Figure 5B:
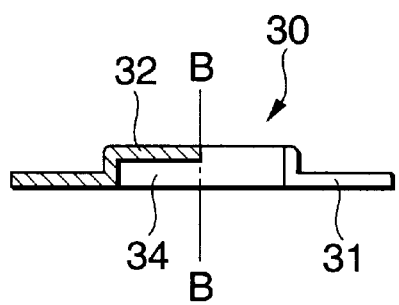
FIG. 5(b) is a partially cutaway front view.
Figure 5C:
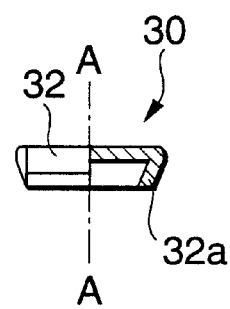
FIG. 5(c) is a partially cutaway side view.
Figure 5D:
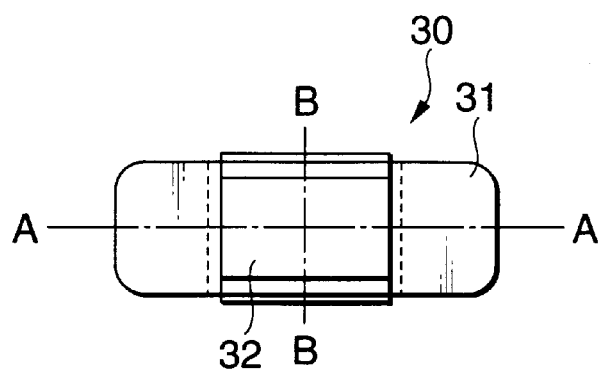
FIG. 5(d) is a bottom view.
Figure 6A:
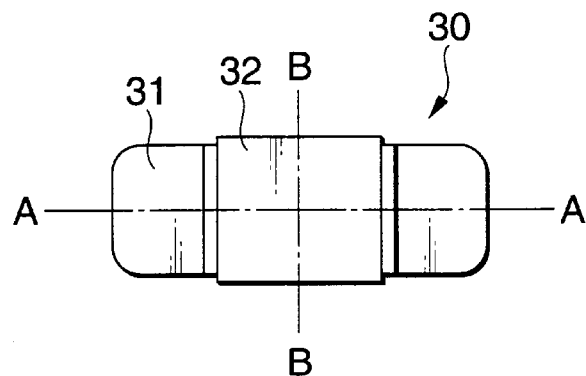
FIG. 6(a) is a top view.
Figure 6B:
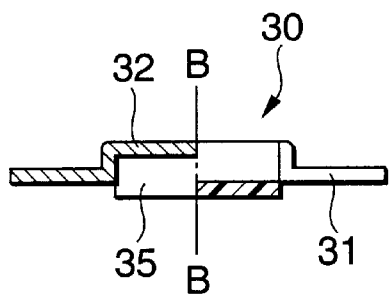
FIG. 6(b) is a partially cutaway front view.
Figure 6C:
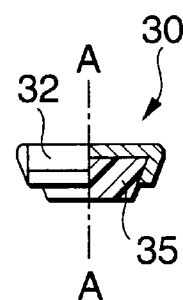
FIG. 6(c) is a partially cutaway side view.
Figure 6D:
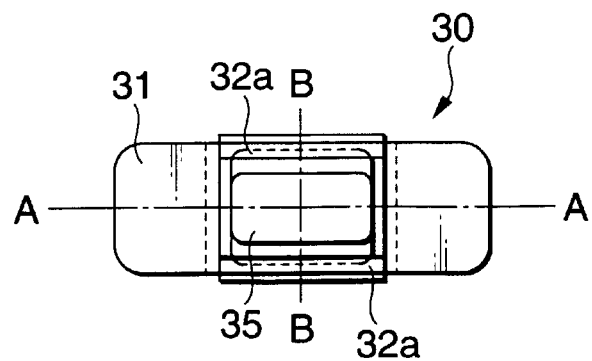
FIG. 6(d) is a bottom view.
Figure 7:
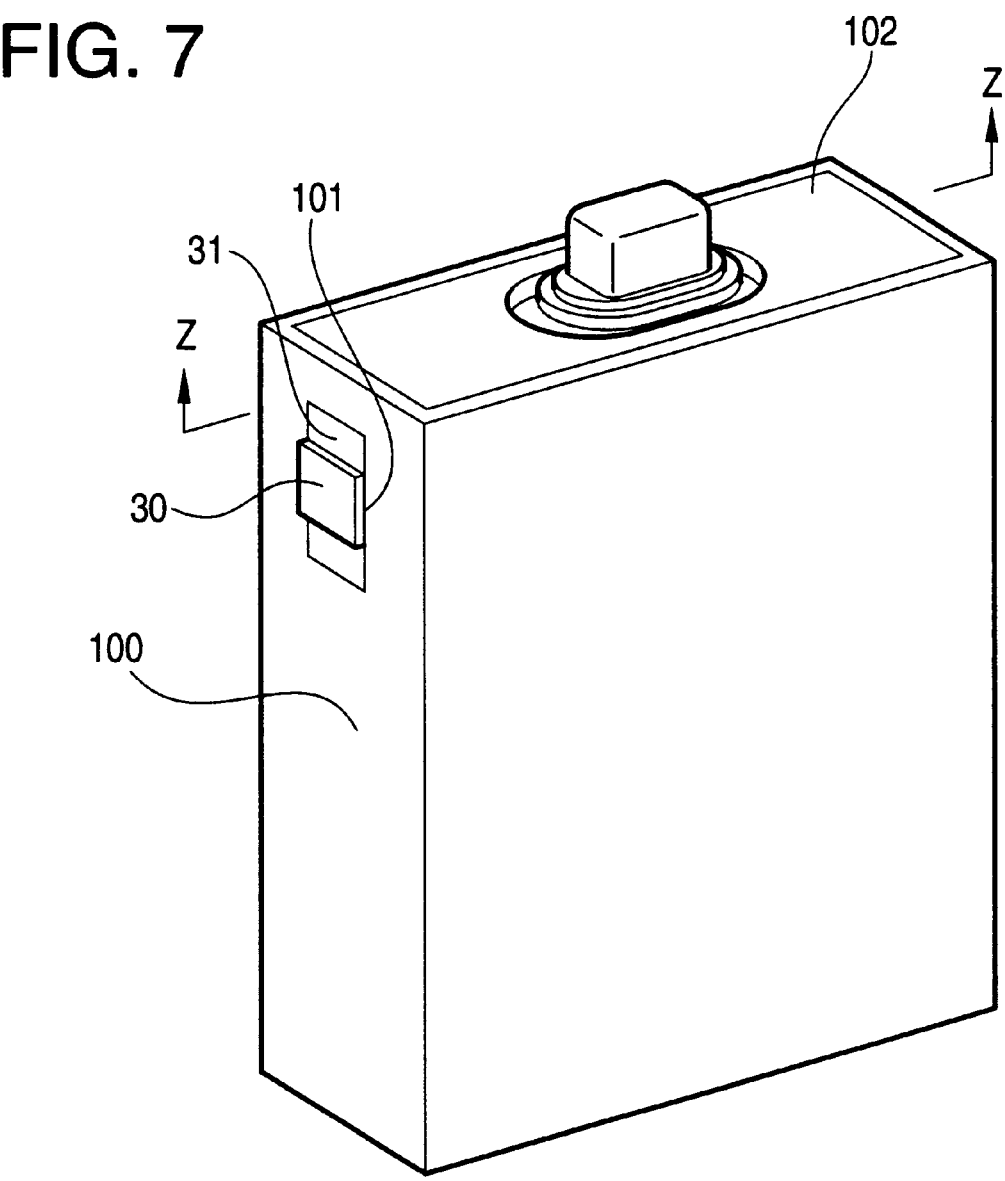
FIG. 7 is a view showing a battery using the cover body of FIG. 5.
Figure 8:
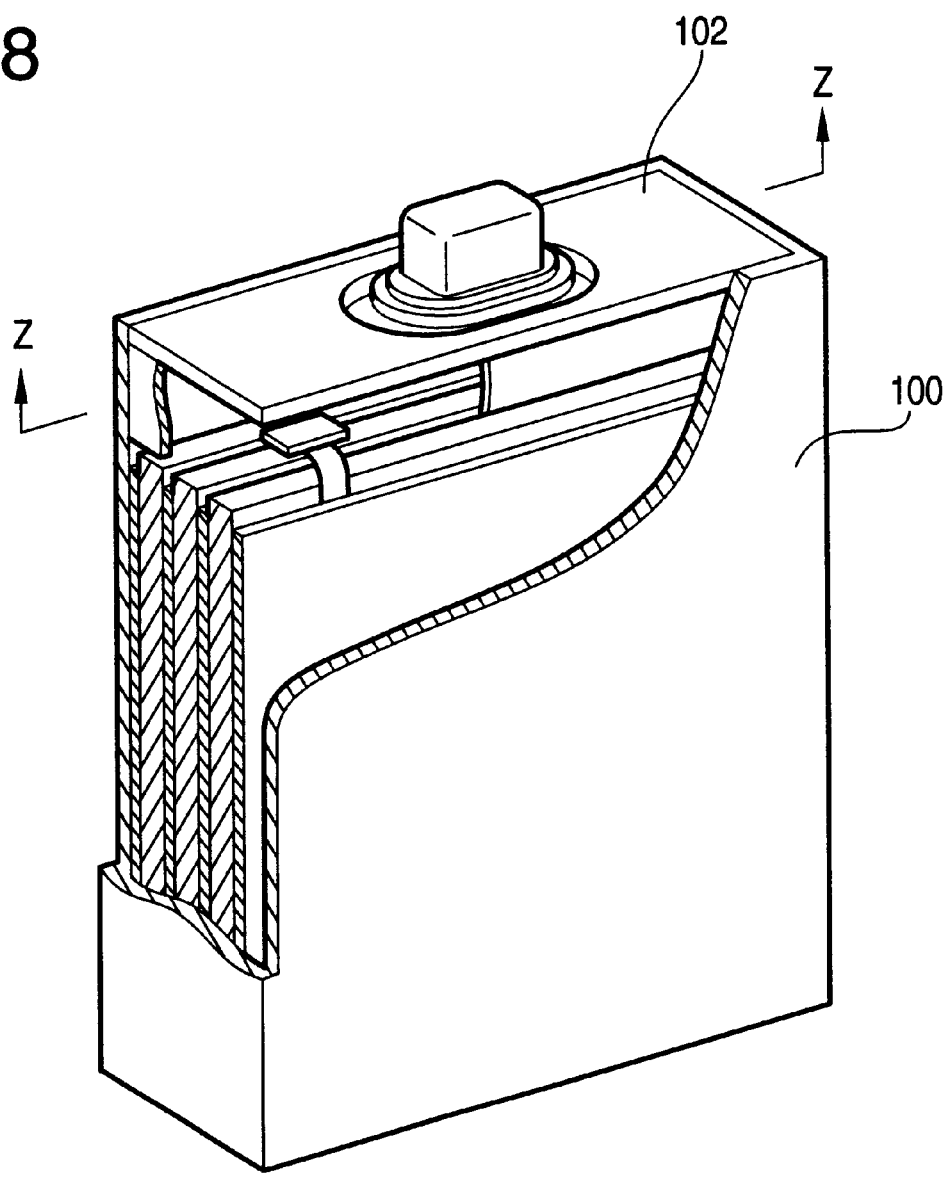
FIG. 8 is a partially cutaway view showing a battery using the cover body of FIG. 5.

Further, FIG. 5 is a diagram illustrating a cover body of the third example wherein FIG. 5(a) is a top view, FIG. 5(b) is a partially cutaway front view, FIG. 5(c) is a partially cutaway side view, and FIG. 5(d) is a bottom view. FIG. 6 is a diagram illustrating an elastic body mounted on the cover body of FIG. 5 wherein FIG. 6(a) is a top view, FIG. 6(b) is a partially cutaway front view, FIG. 6(c) is a partially cutaway side view, and FIG. 6(d) is a bottom view. FIG. 7 is a view showing a battery using the cover body of FIG. 5. FIG. 8 is a partially cutaway view showing a battery using the cover body of FIG. 5.

1. Preparation of Cover Body

(1) EXAMPLE 1

A cover body 10 of Example 1 of the invention comprises a flange portion 11 and a bulge portion 12 protruding upwardly of the flange portion 11 and provided with a space 14 in which an elastic valve body 15 is fitted as shown in FIGS. 1 and 2 and can be prepared by punching from a nickel-plated steel plate (having a thickness of 0.3 mm for example) through a punching die. The bulge portion 12 is provided with openings 13, 13 for ventilation at the lower portion of opposing side walls thereof and protrusion portions 12a, 12a at the lower end of opposing side walls thereof protruding inwardly of the side walls, respectively.

An elastic valve body 15 to be fitted in the space 14 in the bulge portion 12 of the cover body 10 is formed by molding EPDM (ethylene-propylene-diene rubber) into a substantially columnar shape and comprises an annular rim 15a formed at the center of the outer wall of the column. The outer diameter of the columnar portion of the elastic valve body 15 is predetermined slightly smaller than the smallest dimension between the opposing side walls of the bulge portion 12. The outer diameter of the annular rim 15a is predetermined greater than the dimension between the protrusion portions 12a and equal to the largest dimension between the opposing side walls of the bulge portion 12. In this arrangement, when the elastic valve body 15 is fitted in the space 14 in the bulge portion 12 of the cover body 10, the annular rim 15a of the elastic valve body 15 is engaged by the protrusion portions 12a. Thus, the elastic valve body 15 can be prevented from coming off from the cover body 10 due to vibration or the like.

(2) EXAMPLE 2

A cover body 20 of Example 2 of the invention comprises a flange portion 21 and a bulge portion 22 protruding upwardly of the flange portion 21 and provided with a space 24 in which an elastic valve body 25 is fitted as shown in FIGS. 3 and 4. The cover body 20 is prepared by punching from a nickel-plated steel plate (having a thickness of 0.3 mm for example) through a punching die. The bulge portion 22 is provided with openings 23, 23 for ventilation at the lower portion of opposing side walls thereof and inclined portions 22a, 22a at the opposing pair of side walls thereof running inwardly of the side walls, respectively.

An elastic valve body 25 to be fitted in the space 24 in the bulge portion 22 of the cover body 20 is formed by molding EPDM into a substantially columnar shape and comprises an annular rim 25a formed at the upper portion of the outer wall of the column. The outer diameter of the columnar portion of the elastic valve body 25 is predetermined slightly smaller than the smallest dimension between the opposing side walls of the bulge portion 22. The outer diameter of the annular rim 25a is predetermined greater than the smallest dimension between the opposing side walls of the bulge portion 22 and equal to the largest dimension between the opposing side walls of the bulge portion 22. In this arrangement, when the elastic valve body 25 is fitted in the space 24 in the bulge portion 22 of the cover body 20, the annular rim 25a of the elastic valve body 25 is engaged by the lower portion of the inclined portion. Thus, the elastic valve body 25 can be prevented from coming off from the cover body 20 due to vibration or the like.

(3) EXAMPLE 3

A cover body 30 of Example 3 of the invention comprises a flange portion 31 and a bulge portion 32 protruding from the flange portion 31 and provided with a space 34 in which an elastic body 35 is fitted as shown in FIGS. 5 and 6. The cover body 30 is prepared by punching from a nickel-plated steel plate (having a thickness of 0.3 mm for example) through a punching die. The bulge portion 32 is provided with inclined portions 32a, 32a at the opposing pair of side walls thereof running inwardly of the side walls, respectively. Since the cover body 30 doesn't need to act as a safety valve unit, the bulge portion 32 is not provided with any opening for ventilation at the lower portion of the opposing side walls thereof. Thus, the elastic body 35 is provided to seal an injection port described later.

The elastic body 35 to be fitted in the space 34 in the bulge portion 32 of the cover body 30 is formed by molding EPDM into a substantially columnar shape. The outer diameter of the columnar portion of the elastic body 35 is predetermined greater than the minimum dimension between the opposing side walls of the bulge portion 32 and equal to the maximum dimension between the opposing side walls of the bulge portion 32. In this arrangement, when the elastic body 35 is fitted in the space 34 in the bulge portion 32 of the cover body 30, the elastic body 35 is engaged by the lower portion of the inclined portion 32a. Thus, the elastic valve body 35 can be prevented from coming off from the cover body 30 due to vibration or the like.

2. Falling Test of Elastic Valve Body or Elastic Body 10,000 samples were prepared for each of the cover bodies 10, 20 and 30 of Examples 1 to 3, respectively, thus prepared and the conventional cover body as mentioned above. The number of cover body samples from which the elastic valve body or elastic body had come off was determined. The results are set forth in Table 1 below.

TABLE 1

| Type of cover body | Example 1 | Example 2 | Example 3 | Conventional example |
|---|---|---|---|---|
| Number of samples coming off | 0 | 0 | 0 | 3 |

As can be seen in Table 1 above, the cover bodies 10, 20 and 30 of the examples of the invention didn't allow the elastic valve bodies 15 and 25 and the elastic body 35 to come off therefrom, respectively.

3. Preparation of Rectangular Nickel-hydrogen Storage Battery (1) EXAMPLE 1

Subsequently, a group of electrode plates having a hydrogen-absorbing alloy negative electrode plate and a nickel positive electrode plate laminated on each other with a separator provided interposed therebetween was prepared. The group of electrode plates thus prepared was then inserted into a closed-end prismatic (rectangular) metallic can. A lead extending from the negative electrode plate of the group of electrode plates was connected to the negative electrode terminal while a lead extending from the positive electrode plate was connected to the positive electrode terminal. Separately, a sealing plate was prepared by placing the foregoing cover body 10 of Example 1 on a gas vent provided in a sealing plate (not shown), and then spot-welding the periphery of the flange portion 11 of the cover body 10 to the sealing plate. Thereafter, an electrolytic solution comprising a 30 wt-% aqueous solution of potassium hydroxide (KOH) was injected into the metallic can. The sealing plate previously prepared was then laser-welded to the opening of the metallic can to prepare a hermetically sealed rectangular nickel-hydrogen storage battery of Example 1.

(2) EXAMPLE 2

By placing the foregoing cover body 20 of Example 2 on a gas vent provided in a sealing plate, and then spot-welding the periphery of the flange portion 21 of the cover body 20 to the sealing plate, a sealing plate (not shown) was previously prepared. Thereafter, an electrolytic solution comprising a 30 wt-% aqueous solution of potassium hydroxide (KOH) was injected into a metallic can. The sealing plate previously prepared was then laser-welded to the opening of the metallic can to prepare a hermetically sealed rectangular nickel-hydrogen storage battery of Example 2.

(3) EXAMPLE 3

On the other hand, a group of electrode plates having a hydrogen-absorbing alloy negative electrode plate and a nickel positive electrode plate laminated on each other with a separator provided interposed therebetween was prepared. As shown in FIGS. 7 and 8, the group of electrode plates thus prepared was then inserted into a closed-end prismatic (rectangular) metallic can 100. A lead extending from the negative electrode plate of the group of electrode plates was connected to the negative electrode terminal while a lead extending from the positive electrode plate was connected to the positive electrode terminal. Subsequently, a sealing plate 102 was laser-welded to the opening 101 of a metallic can 100. Thereafter, an electrolytic solution comprising a 30 wt-% aqueous solution of potassium hydroxide (KOH) was injected into the metallic can through an injection port provided on the side wall thereof. By placing the foregoing cover body 30 of Example 3 on the injection port, and then spot-welding the periphery of the flange portion 31 of the cover body 30 to the metallic can, a hermetically sealed rectangular nickel-hydrogen storage battery of Example 3 was prepared.

4. Battery Sealability Test

Subsequently, 1,000 samples were prepared for each of the batteries of Examples 1 to 3 and the battery of the conventional example. These samples were each fully charged, allowed to stand in a 60° C. constant temperature bath for 1 week, and then judged for the number of samples showing the leakage of electrolytic solution from the cover bodies 10, 20 and 30, respectively (evaluation of sealability). The results are set forth in Table 2 below.

TABLE 2

| Type of cover body | Example 1 | Example 2 | Example 3 | Conventional example |
|---|---|---|---|---|
| Number of samples showing leakage | 0 | 1 | 1 | 2 |

As can be seen in Table 2 above, the comparison of the batteries of Examples 1 to 3 with the battery of the conventional example shows that the total number of samples of the batteries of Examples 1 to 3 showing the leakage of electrolytic solution is not greater than the number of samples of the battery of the conventional example showing the leakage of electrolytic solution. Accordingly, the batteries comprising the cover bodies 10, 20 and 30 can prevent the elastic valve bodies 15 and 25 and the elastic body 35 from coming off from the cover bodies 10, 20 and 30, respectively, while keeping its sealability equal to or better than that of the battery of the conventional example, drastically enhancing the production yield.

In the foregoing examples, it is preferred that the annular rim 15a in the elastic valve body 15 be positioned at the vertically central portion of the elastic valve body 15. This is because the elastic valve body 15 is vertically symmetrical about the central line and thus vertically compatible, making it easy to design the parts feeder to be mounted on the assembling apparatus for fitting the elastic valve body 15 in the cover body 10.

The foregoing arrangement that the annular rim 15a is positioned at the vertically central portion of the elastic valve body 15 is disadvantageous in that the operating pressure of the elastic valve body 15 varies widely if it is used as a safety value in the cover body of Example 2 shown in FIGS. 3 and 4. However, when the foregoing cover body of Example 1 is used, the contact of the annular rim with the inner surface of the cover body can be made constant because the inner diameter of the cover body is almost constant in the vertical direction, making it possible to reduce the variation of the operating pressure of the safety valve.

On the other hand, in Example 2, an annular rim can be provided at the upper portion of the elastic valve body 25. Thus, the height of the elastic valve body 25 can be reduced, making it possible to reduce the height of the cover body to advantage.

The foregoing examples have been described with reference to the safety valve of alkaline storage battery. However, the present invention can be used as a sealing portion for lithium ion battery into which an electrolytic solution has been injected.

What is claimed is:

1. A hermetically sealed storage battery comprising a cover body for hermetically sealing an opening in the storage body, the cover body comprising:
    a flange portion airtightly fixed to said opening;
    a bulge portion protruding from said flange portion, said bulge portion defining a space in which an elastic body is mounted, said elastic body including an annular rim about its periphery, wherein said elastic body is inserted into said space from an opening adjacent a flange side of said bulge portion; and
    a hook portion formed on an inner wall of said bulge portion, said hook portion being shaped to at least partially engage said annular rim of said elastic body, thereby preventing said elastic body from coming off of the storage battery cover body.

2. The hermetically sealed storage battery according to claim 1, wherein said the bulge portion is defined by opposing side walls protruding from said flange portion, and wherein said hook portion comprises a protrusion portion extending into said space from at least one of said opposing side walls, said protrusion portion engaging said elastic body.

3. The hermetically sealed storage battery according to claim 2, wherein said protrusion portion comprises a plurality of protrusions extending into said space from a corresponding plurality of said opposing side walls.

4. The hermetically sealed storage battery according to claim 3, wherein a distance between said protrusion portions is less than an outer diameter of the annular rim.

5. The hermetically sealed storage battery according to claim 2, wherein said annular rim is disposed at a middle section of said elastic body.

6. The hermetically sealed storage battery according to claim 1, wherein said the bulge portion is defined by opposing side walls protruding from said flange portion, and wherein said hook portion comprises at least one of said side walls disposed at an incline into said space toward said flange portion.

7. The hermetically sealed storage battery according to claim 6, wherein a distance between said opposing side walls is less than an outer diameter of the annular rim.

8. The hermetically sealed storage battery according to claim 6, wherein the bulge portion is further defined with a ceiling connecting said opposing side walls, and wherein said elastic body is mounted so as to contact said side walls and said ceiling of said bulge portion.

9. The hermetically sealed storage battery according to claim 6, wherein said annular rim is disposed at an end section of said elastic body.

10. The hermetically sealed storage battery according to claim 2, wherein said protrusion portion comprises a pair of protrusions protruding slant-inwardly from two positions being symmetrical to each other.

11. The hermetically sealed storage battery according to claim 2, wherein said bulge portion is provided with an opening for ventilation in at least one of said opposing side walls.

12. The hermetically sealed storage battery according to claim 4, wherein said bulge portion is provided with an opening for ventilation in at least one of said opposing side walls.

13. A hermetically sealed storage battery comprising a cover body for hermetically sealing an opening in the storage body, the cover body comprising:
    a flange portion airtightly fixed to said opening;
    a bulge portion protruding from said flange portion, said bulge portion defining a space in which an elastic body is mounted, said elastic body including an annular rim about its periphery, wherein said elastic body is inserted into said space from an opening adjacent a flange side of said bulge portion; and
    a hook portion formed on an inner wall of said bulge portion, said hook portion extending into said space to engage said annular rim, thereby preventing said elastic body from coming off of the storage battery cover body.

* * * * *